US 12,152,942 B2

(12) United States Patent
Koch et al.

(10) Patent No.: US 12,152,942 B2
(45) Date of Patent: Nov. 26, 2024

(54) NONINVASIVE THERMOMETER

(71) Applicant: Endress+Hauser Wetzer GmbH+Co. KG, Nesselwang (DE)

(72) Inventors: Daniel Koch, Oy-Mittelberg (DE); Marc Schalles, Erfurt (DE); Harald Bründl, Schwabhausen (DE); Stephan Wiedemann, Bihlerdorf (DE); Peter Wiedemann, Weitnau (DE); Torsten Iselt, Kempten (DE); Christian Peuker, Immenstadt (DE); Pavo Vrdoljak, Nesselwang (DE); Georg Wolf, Marktoberdorf (DE); Christian Kallweit, Memmingen (DE); Markus Mornhinweg, Dießen (DE); Alfred Umkehrer, Hopferau (DE)

(73) Assignee: ENDRESS+HAUSER WETZER GMBH+CO. KG, Nesselwang (DE)

( * ) Notice: Subject to any disclaimer, the term of this patent is extended or adjusted under 35 U.S.C. 154(b) by 45 days.

(21) Appl. No.: 17/753,673

(22) PCT Filed: Aug. 20, 2020

(86) PCT No.: PCT/EP2020/073390
§ 371 (c)(1),
(2) Date: Mar. 10, 2022

(87) PCT Pub. No.: WO2021/047882
PCT Pub. Date: Mar. 18, 2021

(65) Prior Publication Data
US 2024/0044723 A1 Feb. 8, 2024

(30) Foreign Application Priority Data
Sep. 12, 2019 (DE) .................. 10 2019 124 604.0

(51) Int. Cl.
*G01K 13/02* (2021.01)
*G01K 1/143* (2021.01)
*G01K 15/00* (2006.01)

(52) U.S. Cl.
CPC ............. *G01K 13/02* (2013.01); *G01K 1/143* (2013.01); *G01K 15/005* (2013.01)

(58) Field of Classification Search
CPC ....... G01K 13/02; G01K 1/143; G01K 15/005
See application file for complete search history.

(56) References Cited

U.S. PATENT DOCUMENTS

| | | | | | |
|---|---|---|---|---|---|
| 3,848,466 | A | * | 11/1974 | Dial | G01K 13/02 374/E13.006 |
| 4,336,708 | A | * | 6/1982 | Hobgood | G01M 3/18 73/40.5 R |

(Continued)

FOREIGN PATENT DOCUMENTS

| | | | |
|---|---|---|---|
| CN | 206954934 U | * | 2/2018 |
| DE | 3126931 A1 | | 2/1983 |

(Continued)

OTHER PUBLICATIONS

U.S. Appl. No. 17/753,673, filed Jun. 10, 2024_CN_206954934_U_H.pdf, Feb. 2, 2018.*

(Continued)

*Primary Examiner* — Gail Kaplan Verbitsky
(74) *Attorney, Agent, or Firm* — Brannon Sowers & Cracraft PC

(57) ABSTRACT

The present disclosure relates to an apparatus for determining and/or monitoring a temperature of a medium in a containment, including a temperature sensor for registering temperature, and a flexible, heat-conductive support ele- (Continued)

ment, which is arrangeable on an outer surface of a wall of the containment, wherein the temperature sensor is secured to the support element.

16 Claims, 3 Drawing Sheets

(56) References Cited

U.S. PATENT DOCUMENTS

| | | | | |
|---|---|---|---|---|
| 4,346,864 A * | 8/1982 | Feller | ............... | G01K 1/16 |
| | | | | 374/E1.019 |
| 4,433,329 A * | 2/1984 | Streib | ............... | G01F 1/6847 |
| | | | | 374/30 |
| 4,575,258 A * | 3/1986 | Wall | ............... | G01M 3/002 |
| | | | | 374/E5.041 |
| 5,141,335 A * | 8/1992 | Wannamaker | ......... | G01K 1/143 |
| | | | | 374/E1.019 |
| 5,382,093 A | 1/1995 | Dutcher | | |
| 6,779,919 B1 * | 8/2004 | Staniforth | ............. | G01K 1/143 |
| | | | | 374/E1.019 |
| 6,886,393 B1 * | 5/2005 | Romanet | ............ | G01B 21/085 |
| | | | | 73/61.62 |
| 8,220,722 B1 * | 7/2012 | Shaffer | ............... | E03C 1/05 |
| | | | | 236/94 |
| 9,733,130 B2 * | 8/2017 | Blundell | ............... | G01K 1/026 |
| 10,364,555 B2 * | 7/2019 | Trescott | ............... | G01M 3/002 |
| 2004/0028118 A1 * | 2/2004 | Sidoni | ............... | G01K 1/143 |
| | | | | 374/E1.019 |
| 2012/0051389 A1 * | 3/2012 | Schalles | ............... | G01K 15/002 |
| | | | | 374/1 |
| 2012/0193086 A1 * | 8/2012 | van Dijk | ............... | G01K 1/14 |
| | | | | 374/185 |
| 2014/0161151 A1 * | 6/2014 | Proctor | ............... | G01K 13/02 |
| | | | | 374/147 |
| 2014/0334517 A1 | 11/2014 | Blundell et al. | | |
| 2015/0182159 A1 | 7/2015 | Sella | | |
| 2016/0047697 A1 | 2/2016 | Decker et al. | | |
| 2016/0298317 A1 | 10/2016 | Trescott | | |
| 2017/0328784 A1 | 11/2017 | Blundell et al. | | |
| 2019/0390990 A1 * | 12/2019 | Krywyj | ............... | G01N 29/041 |

FOREIGN PATENT DOCUMENTS

| | | | |
|---|---|---|---|
| DE | 4244189 A1 | 7/1994 | |
| DE | 202006003903 U1 | 10/2006 | |
| DE | 102005040699 B3 | 1/2007 | |
| DE | 102009007948 A1 | 9/2010 | |
| DE | 102009003848 A1 | 11/2010 | |
| DE | 102012112575 A1 | 7/2014 | |
| DE | 102014118206 A1 | 6/2016 | |
| DE | 102015009618 A1 | 2/2017 | |
| DE | 102015112425 A1 | 2/2017 | |
| DE | 102015113237 A1 | 2/2017 | |
| DE | 102017100267 A1 | 7/2018 | |
| DE | 102017120941 A1 | 3/2019 | |
| DE | 102018116309 A1 | 1/2020 | |
| EP | 2038625 A1 | 3/2009 | |
| EP | 3230704 A1 | 3/2009 | |
| EP | 2612122 B1 | 7/2013 | |
| EP | 3633337 A1 | 4/2020 | |
| JP | H06223634 A * | 8/1994 | |
| JP | 2014170768 A * | 9/2014 | |
| JP | 6164381 B1 * | 7/2017 | ............ G01K 1/14 |
| KR | 20130022836 A * | 3/2013 | |
| KR | 20160037601 A * | 4/2016 | |

OTHER PUBLICATIONS

U.S. Appl. No. 17/753,673, filed Jun. 10, 2024_KR_20130022836_A_H.pdfMar. 7, 2013.*
U.S. Appl. No. 17/753,673, filed Jun. 10, 2024_KR_20160037601_A_H.pdf,Apr. 6, 2016.*
U.S. Appl. No. 17/753,673, filed Jun. 10, 2024_JP_6164381_B1_H.pdf,Jul. 19, 2017.*
U.S. Appl. No. 17/753,673, filed Sep. 24, 2024_JP_2014170768_A_H.pdf,Sep. 18, 2014.*
U.S. Appl. No. 17/753,673, filed Sep. 24, 2024_JP_H06223634_A_H.pdf,Aug. 12, 1994.*

* cited by examiner

NONINVASIVE THERMOMETER

CROSS-REFERENCE TO RELATED APPLICATIONS

The present application is related to and claims the priority benefit of German Patent Application No. 10 2019 124 604.0, filed on Sep. 12, 2019, and International Patent Application No. PCT/EP2020/073390, filed Aug. 20, 2020, the entire contents of which are incorporated herein by reference.

TECHNICAL FIELD

The invention relates to an apparatus for determining and/or monitoring temperature of a medium in a containment in automation technology. The containment is, for example, a container or a pipeline.

BACKGROUND

Thermometers are known in a wide variety of embodiments in the state of the art. Thus, there are thermometers, which for measuring temperature use the expansion of a liquid, a gas or a solid of known coefficient of thermal expansion, or such, which relate the electrical conductivity of a material, or a variable derived therefrom, to the temperature, such as, for example, the electrical resistance in the case of application of resistance elements or the thermoelectric effect in the case of thermocouples. In contrast, in the case of radiation thermometers, especially pyrometers, for determining the temperature of a substance, its heat radiation is utilized. The measuring principles of these measuring devices are described in a large number of publications.

In the case of a temperature sensor in the form of a resistance element, known, among others, are so-called thin film- and thick film sensors as well as a so-called NTC thermistor. In the case of a thin film sensor, especially a Resistance Temperature Detector (RTD) sensor element is used, for example, one equipped with connection wires and applied on a substrate, wherein the rear face of the support substrate is, as a rule, metal coated. Used as sensor elements are so-called resistance elements, which are based, for example, on platinum elements and which are also commercially obtainable, among others, under the designations, PT10, PT100, and PT1000.

In the case of temperature sensors in the form of thermocouples, in turn, the temperature is determined by a thermovoltage, which occurs between the unilaterally connected thermocouple wires of different materials. For temperature measurement, usually thermocouples of DIN standard IEC584 are applied as temperature detector, e.g. thermocouples of type K, J, N, S, R, B, T or E. However, also other material pairs, especially such having a measurable Seebeck effect, are possible.

The accuracy of temperature measurement depends sensitively on the thermal contacts and the particularly reigning heat conduction. The heat flows between the medium, the containment, in which the medium is located, the thermometer and the process environment in such case play a deciding role. For a reliable temperature determination, it is important that the temperature sensor and the medium be essentially in thermal equilibrium, at least for a certain time required for registering the temperature. The time for a reaction of a thermometer to a temperature change is also referred to as response time of the thermometer.

A high accuracy of measurement can especially be achieved when the temperature sensor is immersed in the medium. Thus, numerous thermometers are known, in the case of which the temperature sensor is brought more or less directly in contact with a medium. In this way, a comparatively good coupling between the medium and the temperature sensor can be achieved.

For different processes and for many containments, especially small containers or pipelines, however, a noninvasive determination of the temperature is advantageous. Thus, likewise, thermometers are known, which can be secured from the outside/inside to a containment, in which the medium is located. Such devices, also called surface thermometers or contact sensors, are known, for example, from documents such as DE102014118206A1 or DE102015113237A1. In the case of such measuring devices, the temperature sensors are not in direct contact with the process. This requires that, for assuring a good thermal coupling, various additional aspects must be taken into consideration. Thus, for example, the mechanical and therewith also the thermal contact between container and thermometer is decisive for the achievable accuracy of measurement. In the case of insufficient contact, an exact temperature determination is not possible.

Used as surface- or skin point thermometers are frequently measuring inserts with temperature sensors in the form of thermocouples, which are directly welded to the outer surface or skin of the pipe or container. In such case, replacement of the thermocouples can be time-consuming and expensive, especially because replacement can require a temporary shutdown of the process and/or application. In order to overcome these disadvantages, there are known, for example, from U.S. Pat. No. 5,382,093 and European patent application No. 18198608.4, unpublished as of the earliest filing date of this application, in each case, embodiments of thermometers, which enable simple replacement of the temperature sensors.

Known, moreover, are numerous, different embodiments of thermometers for noninvasive temperature measurement, such as described, for example, in the documents, US2016/0047697A1, DE102005040699B3, EP3230704B1 or EP2038625B1.

A central problem in the case of noninvasive temperature determination is the draining of heat from the process to the environment. This causes a significantly greater measurement error than in the case of a direct introduction of a temperature sensor into the process.

SUMMARY

Therefore, an object of the invention is to provide a thermometer for noninvasive temperature measurement, which is distinguished by a high accuracy of measurement.

The object is achieved by the apparatus for determining and/or monitoring a process variable, especially the temperature or the flow, of a medium in a containment, especially a container or a pipeline, according to the present disclosure. The apparatus of the invention includes a temperature sensor for registering temperature and a flexible, heat conducting support element, which is arrangeable on an outer surface of the containment, wherein the temperature sensor is secured to the support element.

The support element is especially embodied in such a manner that it is fittable to the contours of the containment. The support element can be arranged, for example, at least partially around the wall of the containment. Especially preferable is an arrangement along a peripheral line of a cross sectional area perpendicular to the longitudinal axis of the containment in the case of a containment in the form of a pipeline.

The temperature sensor is preferably secured to the support element in a region of the support element facing away from the containment in the state arranged thereon. The apparatus is brought into thermal contact with the containment from an outer region of the containment. The temperature of the medium is accordingly determined indirectly via a wall of the containment. By means of the heat conductive support element, in such case, heat from the process is led to the at least one temperature sensor, which is, thus, essentially in thermal equilibrium with the process. The temperature sensor is, thus, exposed essentially to the process temperature, even though it is located outside of the containment. This, in turn, leads to an increased accuracy of measurement of the apparatus.

The apparatus can optionally further have an electronics. Alternatively, the electronics can also be a separate component, connectable with the apparatus. Advantageously associated with the temperature sensor is, furthermore, at least one connection wire for electrical contact.

An embodiment includes that the temperature sensor is a resistance element or thermocouple.

The apparatus can also further include more than one temperature sensor, wherein all temperature sensors are secured to the support element.

Another embodiment includes that the apparatus, for in situ calibrating and/or validation of at least the temperature sensor, includes at least one reference element, which is secured to the support element and which is composed at least partially of at least one material, which has in the temperature range relevant for calibrating the first temperature sensor at least one phase change at at least one predetermined phase change temperature, in the case of which phase change the material remains in the solid state. In this regard, comprehensive reference is made to EP02612122B1 in the context of the present invention. Advantageously, by the use of the heat conductive support element, the temperature sensor and the reference element are always in thermal equilibrium with one another, independently of the exact arrangement on the support element.

In yet another embodiment, the apparatus includes a heating element, which is secured to the support element. By means of the heating unit, the apparatus can additionally be heated to a predeterminable temperature. Again, the heat conductive support element assures that all components of the apparatus secured to the support element are exposed to essentially the predeterminable temperature.

Moreover, by means of the heating element, a determining of flow can be performed according to the measuring principle of thermal flow measurement well known per se in the state of the art.

In accordance therewith, the flow can be determined in two different ways. Within the scope of the invention, the terminology, flow, includes both a volume flow as well as also mass flow of the medium. Likewise, a flow velocity or flow rate of the medium can be ascertained.

In the first measuring principle, a sensor element is exposed to a medium flowing through a pipeline and heated in such a manner that its temperature remains essentially constant. In the case of known, and, at least at times, constant properties of the medium, such as the temperature of the medium, its density or composition, the mass flow rate of the medium through the pipeline can be ascertained based on the heating power needed for keeping the temperature at the constant value. The temperature of the medium, in such case, is that temperature, which the medium has without an additional heat input of a heating element. In the case of the second measuring principle, in contrast, the heating element is operated with constant heating power and the temperature of the medium measured downstream from the heating element. In such case, the measured temperature of the medium provides information concerning mass flow rate.

The heating element can be, for example, a resistance heater. For example, so-called resistance elements, e.g., RTD resistance elements (Resistance Temperature Detector), especially platinum elements, are used, such as obtainable commercially under the designations, PT10, PT100, and PT1000. The resistance elements are heated via conversion of electrical power supplied to them, e.g., as a result of an increased electrical current supply.

In another embodiment of the apparatus, the temperature sensor comprises a temperature sensitive sensor element, which is electrically connected via at least first and second connection lines, wherein the first connection line is divided into first and second sections, wherein the first section near to the sensor element is composed of a first material, and wherein the second section far from the sensor element is composed of a second material differing from the first, wherein the second connection line is composed of the second material, and wherein the first section of the first connection line and at least one subregion of the second connection line form a first difference temperature sensor in the form of a thermocouple. In this connection, in the context of the present invention, comprehensive reference is made to the German patent application No. 102018116309.6 unpublished as of the earliest filing date of this application. With such an embodiment of the temperature sensor, a draining of heat in the region of the temperature sensor can be registered. An exact knowledge of the draining of heat further increases the accuracy of measurement of the apparatus. In the case of determining a flow, with declining draining of heat, higher flow rates of the medium in the containment can be detected, i.e. the measuring range of the apparatus can be expanded.

Preferably, the at least one temperature sensor as well as the, in given cases, likewise present reference element and/or heating element are secured altogether to the support element in a region of the support element facing away from the containment in the state arranged thereon. In such case, all conceivable, especially geometric, arrangements of the mentioned components of the apparatus on the support element are possible and fall within the scope of the invention.

In a preferred embodiment of the apparatus, the support element is composed of a metal woven or felt fabric, especially using copper. Besides copper, however, also other metals can be used for manufacturing a support element of the invention in the form of a metal woven or felt fabric and likewise fall within the scope of the invention. The support element has, in such case, preferably an areal shape with predeterminable geometric dimensions. The terminology, woven fabric, means, in such case, a fabric produced from two different, flexible strands, or wires, of the applied metal—the warp and the woof (i.e., weft)—which cross one another regularly at a certain angle, while the terminology, felt fabric, means a fabric composed of a large number of felted, flexible, metal strands, or metal wires.

Another preferred embodiment includes that the apparatus has a thermal insulation unit, which at least partially surrounds the support element. Especially, the thermal insulation unit surrounds the support element at least partially in a region far from the process in the state of the support element secured thereto. The insulation unit serves for thermal insulation of the support element as well as the at least one temperature sensor secured thereto from the environment. In this way, an undesired draining of heat to the environment is prevented, which could otherwise lead to undesired temperature gradients, especially in the region of the apparatus.

Advantageously, the thermal insulation unit is composed at least partially of a silicone or silicone foam.

It is likewise advantageous that the temperature sensor be arranged between the support element and the thermal insulation unit.

In an additional embodiment, the apparatus includes at least one guide to lead at least one connection line of at least the temperature sensor. The use of a guide serves for mechanical stabilizing of the connection lines and prevents an undesired tearing off of the connection lines.

In the case, in which a thermal insulation unit is present, the guide is especially embodied and arranged in such a manner that the at least one connection line is guidable through the insulation unit. The guide is, for example, a sleeve or a passageway. The number of guides depends on the number of connection lines and the number of components, for example, other temperature sensors, a heating element or a reference element, secured to the support element.

In an especially preferred embodiment, the temperature sensor is secured to the support element by means of a flexible adhesive. In this way, a constant mechanical, and thermal, contact of the temperature sensor and the support element can be assured independently of an outer radius of the containment, along which outer radius the support element is arranged around the containment. There are advantageously no air gaps between the temperature sensor and the support element.

A securement by means of an adhesive is, however, not necessary according to the invention. Rather, all usual securements for securing a temperature sensor can be used. Especially, the temperature sensor can in other embodiments of the invention also, for example, be soldered to the support element.

In yet another especially preferred embodiment, the support element is composed of at least two flexible layers arranged on top of one another. Embodiment of the support element in the form of a plurality of flexible layers arranged on top of one another serves for preventing air gaps between separate parts of the temperature sensor and the support element. In the case of a support element embodied in such a manner, the use of a flexible adhesive is not absolutely necessary.

Another embodiment includes that the apparatus has securement means for an, especially releasable, securing of the apparatus to the containment. In this regard, all usual and suitable securement means known to those skilled in the art, such as e.g., tube clamps, can be used and fall within the scope of the invention.

In such case, the securement means are advantageously embodied to assure a predeterminable compressive pressure of the support element on the containment. In this way, a good and reproducible thermal contact between a wall of the containment and the support element can be assured.

It is likewise advantageous that the securement means have at least one elastic element, especially a spring. With an elastic securement, the same securement means can suitably adapt to different outer radii, especially diameters, of the containments used in particular situations. Especially, essentially the same compressive pressure is assured, in each case, independently of the outer radius.

Another embodiment includes that the containment is a pipeline, wherein the support element is so embodied that it is arrangeable around the pipeline perpendicularly to the longitudinal axis of the pipeline.

BRIEF DESCRIPTION OF THE DRAWINGS

The invention will now be explained in greater detail based on the appended drawing. The figures of the drawing show as follows.

Figure 1:
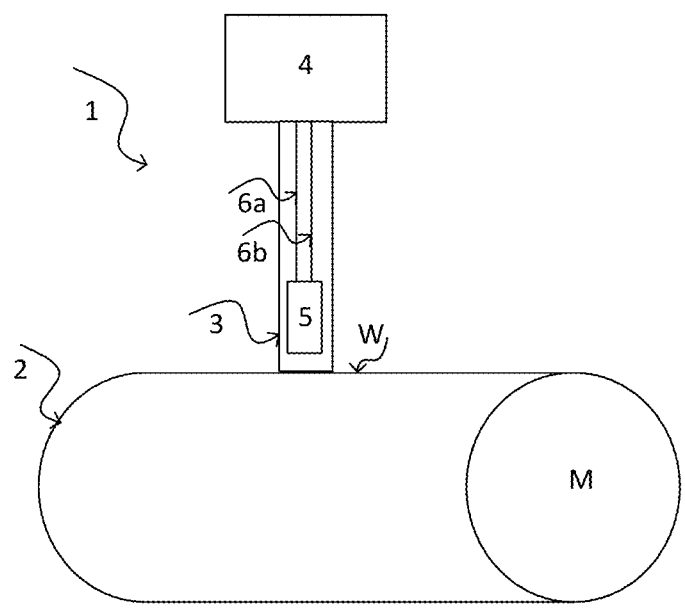
FIG. 1 shows a thermometer for noninvasive temperature measurement according to the state of the art.

In the figures, equal elements are provided with equal reference characters.

DETAILED DESCRIPTION

Shown in FIG. 1 is a schematic view of a thermometer 1 according to the state of the art having a measuring insert 3 and an electronics 4. The thermometer 1 serves for registering the temperature T of a medium M, which is located in a containment 2, in such case, in the form of a pipeline. For such purpose, the thermometer 1 does not protrude into the pipeline 2, but, instead, is superimposed externally on a wall W of the pipeline 2 for a noninvasive temperature determination.

The measuring insert 3 includes a temperature sensor 5, which in the present case comprises a temperature sensitive element in the form of a resistance element. Temperature sensor 5 is electrically contacted via the connection lines 6a, 6b and connected with the electronics 4. While the shown thermometer 1 is embodied in compact construction with integrated electronics 4, in the case of other thermometers 1 the electronics 4 can also be arranged separately from the measuring insert 3. Also, the temperature sensor 5 does not necessarily have to be a resistance element and the number of connection lines 6 does not necessarily have to amount to two. Rather, the number of connection lines 6 can be suitably selected, depending on applied measuring principle and applied temperature sensor 5.

As already indicated, the accuracy of measurement of such a thermometer 1 depends highly on the materials utilized for the thermometer and on the, especially thermal, contacts, especially in the region of the temperature sensor 5. Temperature sensor 5 is indirectly in thermal contact with the medium M, e.g., via the measuring insert 3 and via the wall W of the containment 2. A large role is played in this connection also by a draining of heat of the medium M to the environment, which can lead to an undesired temperature gradient in the region of the temperature sensor 5.

In order suitably to resolve these problems, according to the invention an alternative embodiment for a noninvasive thermometer 1 is provided, such as shown in the following figures by way of example based on some preferred embodiments.

Figure 2:
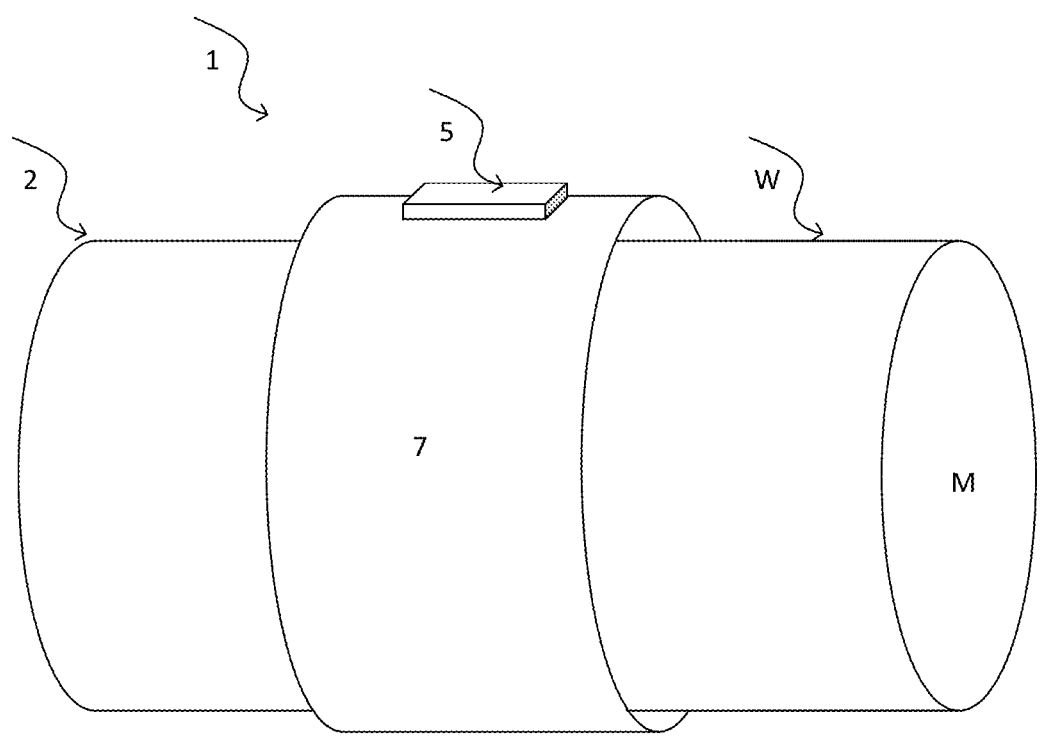
FIG. 2 shows a first embodiment for a thermometer of the present disclosure having a single temperature sensor.

A first embodiment of a thermometer 1 of the invention is shown in FIG. 2. The thermometer 1 includes a flexible heat conducting support element 7, which is arranged on an outer surface of a wall W of the containment 2. For the example shown in such case, with a containment 2 in the form of a pipeline, the support element 7 is arranged perpendicularly to the longitudinal axis of the pipeline 2 around the outer surface of the wall W of the pipeline 2. The support element 7 is, thus, fitted to the contours of the containment 2. It is to be noted here that an apparatus 1 of the invention can also be applied in connection with containers or other types of containments. Support element 7 is arranged on the outer surface of a wall W of the utilized containment 2 and correspondingly fitted to its contour in a predeterminable region.

The temperature sensor 5 is secured to the support element 7. Temperature sensor 5 is secured to the support element 7 in a region of the support element 7 facing away from the process, and, therewith, away from the outer surface of the wall W of the containment 2. In ongoing operation, support element 7 serves, starting from the wall W of the containment 2, to conduct heat from the process, thus, from the medium M, to the temperature sensor 5.

Because the support element 7 is arranged along its surface on the wall W of the containment 7, a good thermal contact with the wall W and therewith with the process, and the medium M, is present. In this way, the temperature sensor 5 is essentially in thermal equilibrium with the medium M, this resulting in a high accuracy of measurement of an apparatus 1.

Figure 3:
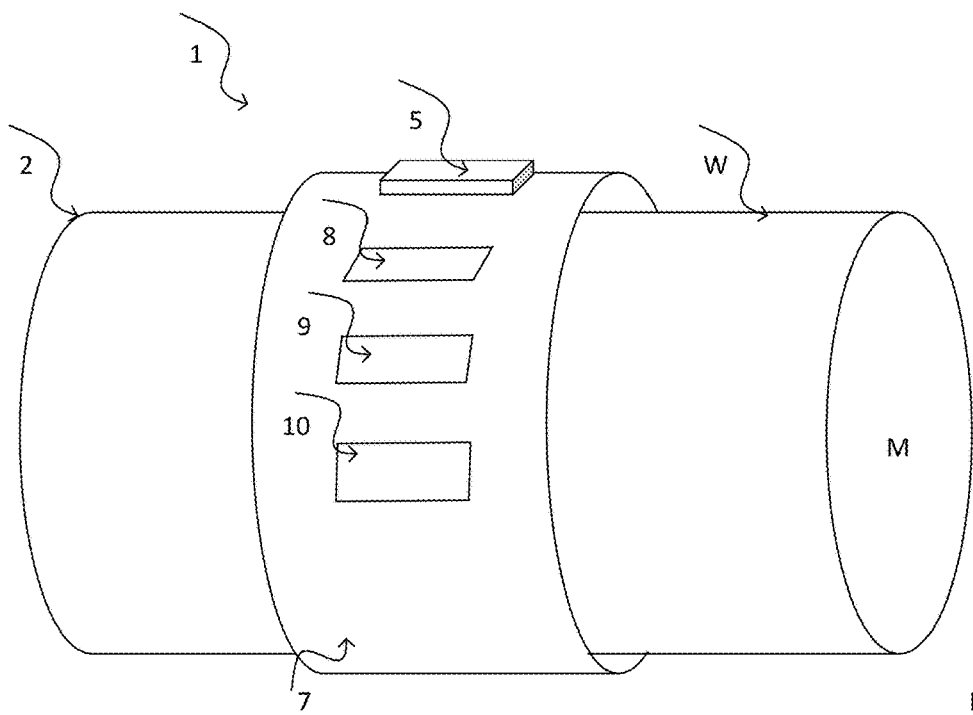
FIG. 3 shows a second embodiment for a thermometer of the present disclosure with two temperature sensors, a heating element and a reference element.

Besides the temperature sensor 5, the apparatus 1 can use other components, such as shown, by way of example, in FIG. 3. In comparison with the embodiment shown in FIG. 2, the apparatus 1 of FIG. 3 includes, supplementally, a heating element 8, a reference element 9 and an additional temperature sensor 10.

Figure 4:
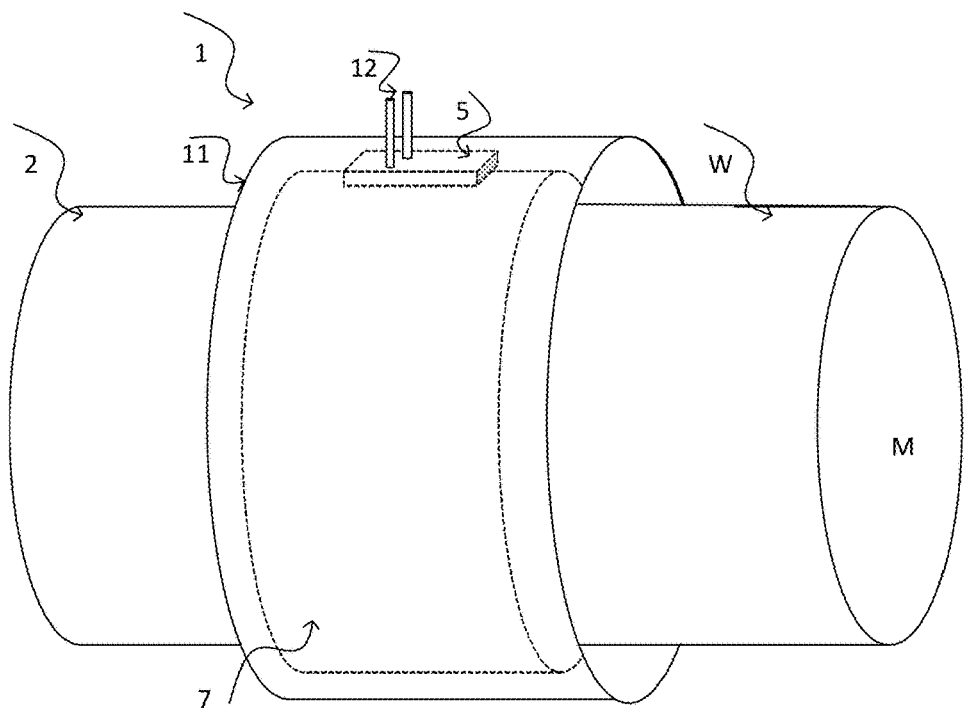
FIG. 4 shows a third embodiment for a thermometer of the present disclosure with a thermal insulation unit.

In the case of the embodiment shown in FIG. 4, the thermometer 1 has, furthermore, a thermal insulation unit 11, which, by way of example, here surrounds the support element 7 completely. In other embodiments, an insulation unit 11 can optionally only partially surround the support element 7. Temperature sensor 5 is arranged between the thermal insulation unit 11 and the support element 7. Insulation unit 11 serves for insulation from the environment and for preventing heat conduction from the support element 7 and/or temperature sensor 5 to the environment. Furthermore, the apparatus 1 includes here, by way of example, two guides 12 to guide connection lines 6 of the temperature sensor 5, which are also led through the insulation unit 11. It is to be noted here that the guides 12 can also be used in embodiments without insulation unit 11, and the number of the utilized guides 12 depends on the number and arrangement of the connection lines 6 of the apparatus 1. The embodiment shown here is, thus, only one possible example.

Figure 5A:
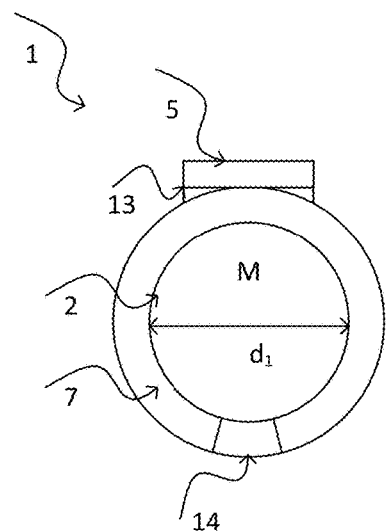
FIGS. 5a and 5b show a fourth embodiment of the present disclosure having a securement unit comprising an elastic element installed on containments of two different diameters, respectively.
Figure 5B:
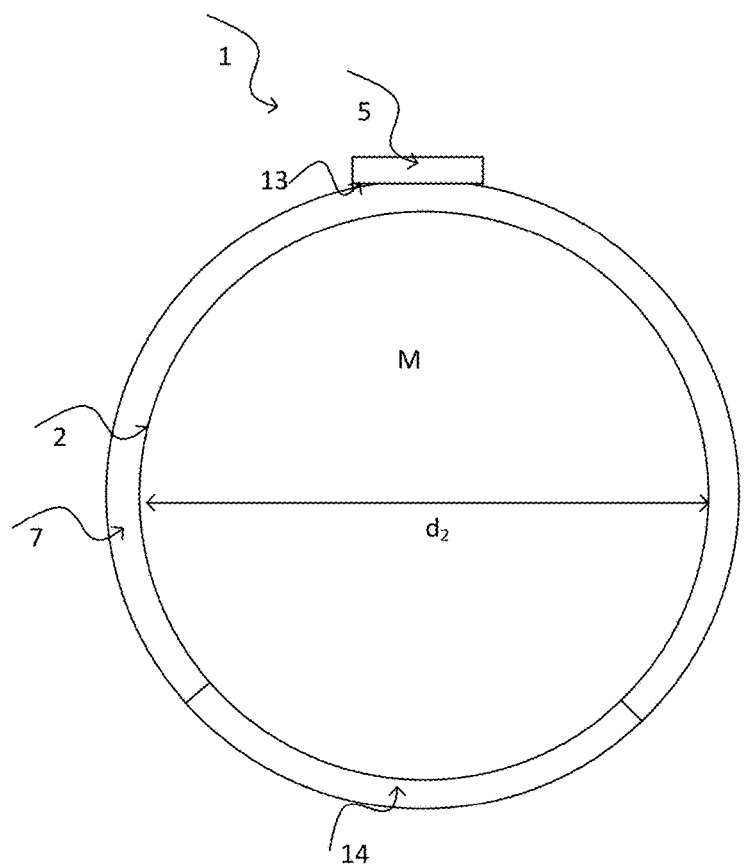

In the embodiment shown in FIG. 5, apparatus 1 includes a securement means 14, which here, by way of example, comprises an elastic element in the form of a spring. By means of the securement means 14, apparatus 1 can be placed on containments 2 of different outer radius. Shown in FIGS. 5*a* and 5*b*, such as in the case of the preceding figures, are containments 2 in the form of pipelines having different diameters $d_1$ and $d_2$, wherein $d_2 > d_1$. Securement means 14 serves, independently of the particularly used containment, to assure an unchanged and good thermal contact of the support element 7, and the temperature sensor 5, with the wall W of the containment 2, and the medium M. Because of the use of a securement means 14 with an elastic element, the assuring of a predeterminable compressive pressure of the support element 7 on the wall W of the containment is implementable in especially easy manner. Nevertheless, numerous other securements are known, which can likewise be applied according to the invention.

In order also to achieve a constant thermal contact of the temperature sensor 5 with the support element 7, the temperature sensor 5 in the shown embodiment is secured to the support element 7 by means of a flexible adhesive 13. The adhesive adapts to the curvature of the support element 7, which, in turn, adapts to the outer surface of a wall W of the containment 2.

Figure 6:
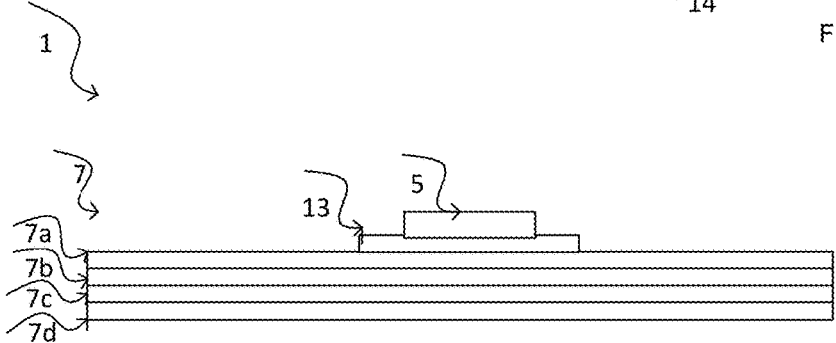
FIG. 6 shows a support element composed of the present disclosure of a plurality of layers.

Such a constant contact between the temperature sensor 5 and the support element 7 can, however, likewise be implemented by a support element 7 having more than one ply, such as shown, finally, in FIG. 6. The support element 7 shown in such case is composed of four layers 7*a*-7*d* arranged on top of one another. Of course, the number of applied layers can vary from embodiment to embodiment. In the case of use of a support element 7 with more than one ply, also a rigid adhesive 13 can be used for securing the temperature sensor 5 to the support element 7.

The invention claimed is:

1. An apparatus for determining and/or monitoring a temperature or flow of a medium in a containment, the apparatus comprising:
    a temperature sensor configured to detect a temperature;
    a flexible, heat-conducting support element including a support element inner side which is disposable on an outer surface of a wall of the containment, and a support element outer side, and wherein the temperature sensor is secured upon the support element outer side; and
    a thermal insulation unit, which at least partially surrounds the support element, wherein the temperature sensor is disposed between the support element and the thermal insulation unit in a layered arrangement including as an innermost layer the support element and as an outermost layer the thermal insulation unit.

2. The apparatus of claim 1, wherein the temperature sensor is a resistance element or a thermocouple.

3. The apparatus of claim 1, further comprising at least one reference element configured for in situ calibrating and/or validation of at least the temperature sensor, wherein the at least one reference element is secured to the support element and is comprised of at least one material, which at least one material has at least one phase change at at least one predetermined phase change temperature in a temperature range suitable for calibrating the temperature sensor, wherein the at least one material remains in a solid state in the at least one phase change.

4. The apparatus of claim 1, further comprising a heating element, which is secured to the support element.

5. The apparatus of claim 1, wherein the support element is comprised of a metal woven or felt fabric.

6. The apparatus of claim 5, wherein the metal includes copper.

7. The apparatus of claim 1, wherein the thermal insulation unit is comprised of a silicone or silicone foam.

8. The apparatus of claim 1, further comprising at least one guide configured as to lead at least one connection line of at least the temperature sensor, and the at least one guide extends in an outward direction through the thermal insulation unit.

9. The apparatus of claim 1, wherein at least the temperature sensor is secured to the support element by a flexible adhesive.

10. The apparatus of claim 1, wherein the support element is comprised of at least two flexible layers arranged one atop the other.

11. The apparatus of claim 1, further comprising a securement means configured to releasably secure the apparatus to the containment.

12. The apparatus of claim 11, wherein the securement means is further configured to ensure a predeterminable compressive pressure of the support element on the containment.

13. The apparatus of claim 11, wherein the securement means includes at least one elastic element.

14. The apparatus of claim 1, wherein the containment is a pipeline, and wherein the support element is configured as to be disposed around the pipeline perpendicular to longitudinal axis of the pipeline.

15. The apparatus of claim 1, wherein:
the support element extends in a circumferential direction at least partially around an axis, and the thermal insulation unit extends in the circumferential direction at least partially around the axis; and
the thermal insulation unit includes a first end located axially outward, in a first axial direction, of the support element, and a second end located axially outward, in an opposite axial direction, of the support element.

16. The apparatus of claim 15 wherein the support element extends fully circumferentially around the axis, and the thermal insulation unit extends fully circumferentially around the axis.

* * * * *